US012158343B2

(12) United States Patent
Tanaka et al.

(10) Patent No.: US 12,158,343 B2
(45) Date of Patent: Dec. 3, 2024

(54) VIDEO CONTROL DEVICE, VIDEO CONTROL METHOD, AND RECORDING MEDIUM

(71) Applicant: Panasonic Intellectual Property Management Co., Ltd., Osaka (JP)

(72) Inventors: Akira Tanaka, Osaka (JP); Fumihito Inukai, Kyoto (JP); Toshiya Mori, Osaka (JP); Ken'ichi Kasazumi, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 491 days.

(21) Appl. No.: 17/556,552

(22) Filed: Dec. 20, 2021

(65) Prior Publication Data

US 2022/0113138 A1 Apr. 14, 2022

Related U.S. Application Data

(63) Continuation of application No. PCT/JP2020/015238, filed on Apr. 2, 2020.

(30) Foreign Application Priority Data

Jun. 24, 2019 (JP) ................. 2019-116243

(51) Int. Cl.
G01C 21/18 (2006.01)
G01C 21/16 (2006.01)
(Continued)

(52) U.S. Cl.
CPC .......... G01C 21/18 (2013.01); G01C 21/165 (2013.01); H04W 4/027 (2013.01); H04W 4/029 (2018.02)

(58) Field of Classification Search
CPC ..... G01C 21/18; G01C 21/165; H04W 4/029; H04W 4/027
See application file for complete search history.

(56) References Cited

U.S. PATENT DOCUMENTS 11,897,486 B1 *  2/2024  Adams ................ G01C 25/005
2013/0218412 A1 *  8/2013  Ricci ................... G06F 11/2025
                                                            701/36
(Continued)

FOREIGN PATENT DOCUMENTS

JP  07-257228  10/1995
JP  08-114455  5/1996
(Continued)

OTHER PUBLICATIONS

International Search Report issued in International Pat. Appl. No. PCT/JP2020/015238, dated Jun. 23, 2020, along with an English translation thereof.
(Continued)

Primary Examiner — Peter D Nolan
Assistant Examiner — Wae L Louie
(74) Attorney, Agent, or Firm — Greenblum and Bernstein, P.L.C.

(57) ABSTRACT

A video control device includes a processor and a memory including a program that, when executed, causes the processor to perform operations including: obtaining a position of a vehicle determined by a satellite positioning system; obtaining an estimated position of the vehicle estimated based on dead reckoning; estimating a deviation in an orientation of the vehicle, based on the position of the vehicle determined by the satellite positioning system and the estimated position of the vehicle estimated based on the dead reckoning; calculating an estimated orientation of the vehicle, based on the deviation in the orientation of the vehicle estimated; and outputting the estimated orientation
(Continued)

of the vehicle to a video display device that displays information which is based on the orientation of the vehicle.

10 Claims, 9 Drawing Sheets

(51) Int. Cl.
*H04W 4/02* (2018.01)
*H04W 4/029* (2018.01)

(56) References Cited

U.S. PATENT DOCUMENTS

| | | | | |
|---|---|---|---|---|
| 2013/0297203 | A1* | 11/2013 | Kelly | G01C 21/18 |
| | | | | 701/461 |
| 2019/0120632 | A1* | 4/2019 | Daikoku | G01C 21/3658 |
| 2019/0196187 | A1* | 6/2019 | Kasazumi | G02B 30/52 |
| 2020/0033127 | A1* | 1/2020 | Tsujii | G06F 1/3212 |
| 2020/0084605 | A1* | 3/2020 | Fraccaroli | H04W 4/21 |
| 2020/0280821 | A1* | 9/2020 | Chon | G06Q 10/06 |
| 2020/0318971 | A1* | 10/2020 | Mori | B60W 30/04 |
| 2020/0348136 | A1* | 11/2020 | Jain | G01C 21/28 |
| 2020/0348137 | A1* | 11/2020 | Jain | G01C 21/20 |
| 2021/0337460 | A1* | 10/2021 | Breaux, III | H04W 8/18 |
| 2022/0113138 | A1* | 4/2022 | Tanaka | G01C 21/28 |
| 2023/0300567 | A1* | 9/2023 | Vassilovski | H04W 4/023 |
| | | | | 455/456.1 |
| 2023/0302904 | A1* | 9/2023 | Tanaka | B60K 35/00 |
| 2023/0379408 | A1* | 11/2023 | Long | H04W 4/02 |
| 2024/0102807 | A1* | 3/2024 | Schmitt | G01C 21/18 |

FOREIGN PATENT DOCUMENTS

| | | |
|---|---|---|
| JP | 09-196692 | 7/1997 |
| JP | 2000-055678 | 2/2000 |
| JP | 2018-045103 | 3/2018 |

OTHER PUBLICATIONS

Office Action from Japan Patent Office (JPO) in Japanese Patent Appl. No. 2021-527393, dated Jul. 18, 2023, together with an English language translation.

* cited by examiner

VIDEO CONTROL DEVICE, VIDEO CONTROL METHOD, AND RECORDING MEDIUM

CROSS REFERENCE TO RELATED APPLICATIONS

This is a continuation application of PCT International Application No. PCT/JP2020/015238 filed on Apr. 2, 2020, designating the United States of America, which is based on and claims priority of Japanese Patent Application No. 2019-116243 filed on Jun. 24, 2019.

FIELD

The present disclosure relates to a video control device, a video control method, and a recording medium.

BACKGROUND

Patent literature (PTL) 1 and 2 disclose technologies that detect the position of an own vehicle by using map data and a GPS (Global Positioning System), etc., and project the route information to a destination in a human field of view with a head-up display (hereinafter also written as a HUD).

CITATION LIST

Patent Literature

PTL 1: Japanese Unexamined Patent Application Publication No. H7-257228
PTL 2: Japanese Unexamined Patent Application Publication No. 2018-045103

SUMMARY

However, the techniques disclosed in above-described PTL 1 and 2 can be improved upon.

In view of this, the present disclosure provides a video control device, etc., that can improve upon the above related art.

A video control device according to an aspect of the present disclosure includes a processor and a memory including a program that, when executed, causes the processor to perform operations including: obtaining a position of a vehicle determined by a satellite positioning system; obtaining an estimated position of the vehicle estimated based on dead reckoning; estimating a deviation in an orientation of the vehicle, based on the position of the vehicle determined by the satellite positioning system and the estimated position of the vehicle estimated based on the dead reckoning; calculating an estimated orientation of the vehicle, based on the deviation in the orientation of the vehicle estimated; and outputting the estimated orientation of the vehicle to a video display device that displays information which is based on the orientation of the vehicle.

Furthermore, a video control method according to an aspect of the present disclosure includes: obtaining a position of a vehicle determined by a satellite positioning system; obtaining an estimated position of the vehicle estimated based on dead reckoning; estimating a deviation in an orientation of the vehicle, based on the position of the vehicle determined by the satellite positioning system and the estimated position of the vehicle estimated based on the dead reckoning; calculating an estimated orientation of the vehicle, based on the deviation in the orientation of the vehicle estimated; and outputting the estimated orientation of the vehicle to a video display device that displays information which is based on the orientation of the vehicle.

Furthermore, a recording medium according to an aspect of the present disclosure is a non-transitory computer-readable recording medium having recorded thereon a program for causing a computer to execute the above-described video control method.

A video control device, etc., according to the present disclosure can improve upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Embodiment

The route information to a destination displayed by a video display device, such as a HUD, may include, for example, the information based on the orientation of a vehicle (the vehicle's own direction) for guiding the vehicle to the destination. The information based on the orientation of the vehicle is, for example, an arrow extending in the direction of movement having the own vehicle as the starting point (refer to FIG. 9 described later), etc. Although it is necessary to estimate the orientation of the vehicle in order to generate the information based on the orientation of the vehicle, when the estimated orientation of the vehicle is deviated from the actual orientation, there is a possibility of giving a discomfort to an occupant of the vehicle who looks at the information based on the orientation of the vehicle. For example, the arrow extending in the direction of movement with the own vehicle as the starting point may be displayed to protrude from a road, since the orientation of the own vehicle has been estimated with a deviation.

In view of this, a video control device, etc., that can increase the accuracy of estimation of the orientation of a vehicle will be described below.

Hereinafter, a video control device according to an embodiment will be described with reference to the drawings.

Figure 1:
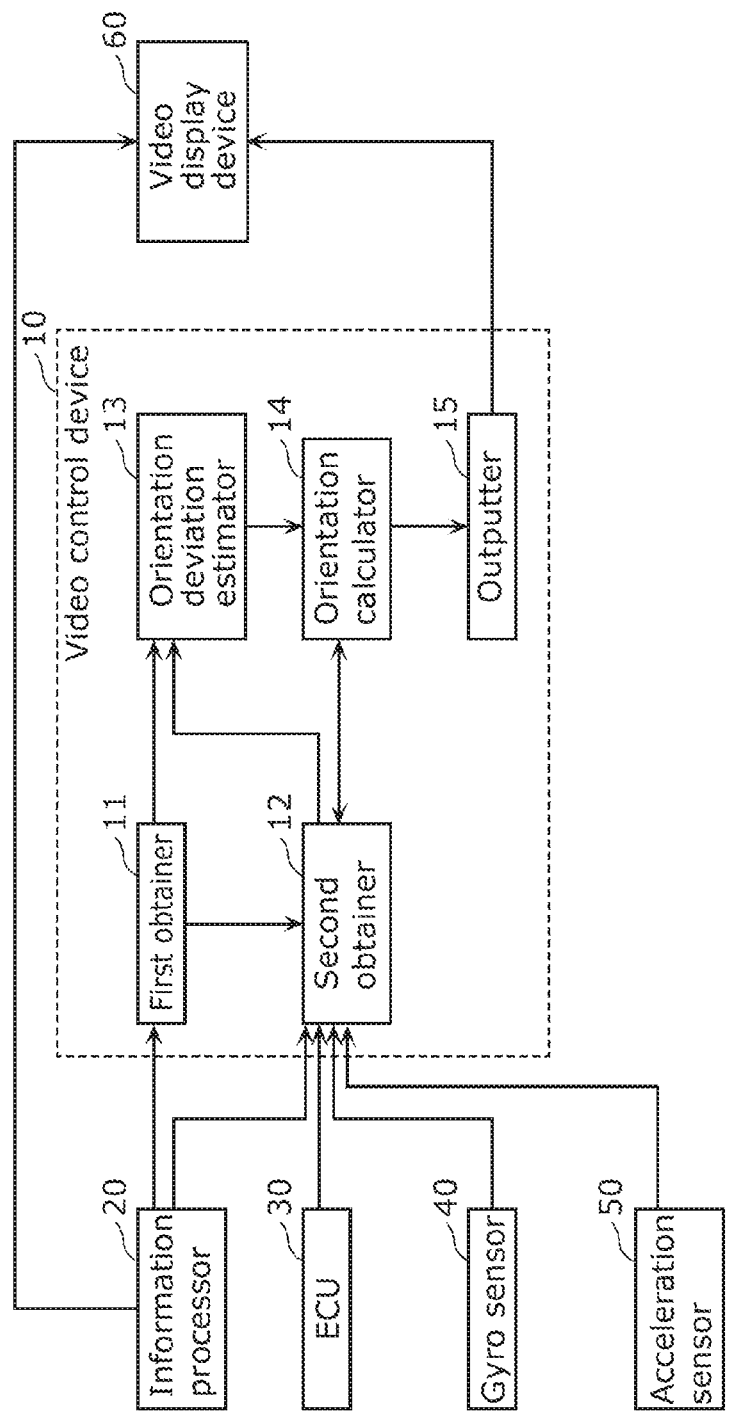
FIG. 1 is a block diagram showing an example of configurations of a video control device according to an embodiment and peripheral devices.

FIG. 1 is a block diagram showing an example of the configurations of video control device 10 according to an embodiment and its peripheral devices. FIG. 1 shows, in addition to video control device 10, information processor 20, ECU 30, gyro sensor 40, acceleration sensor 50, and video display device 60. These devices are mounted in, for example, a vehicle (for example, an automobile).

Information processor 20 is a device that can obtain the position of the vehicle and the orientation of the vehicle that are determined by a satellite positioning system, such as a GPS (Global Positioning System), and the information on routes to a destination of the vehicle (for example, the shortest route to the destination, or a route that avoids traffic jam, etc.), etc., and is, for example, a car-navigation system.

ECU 30 is, for example, an ECU that handles a vehicle speed signal, etc., and is a device that can output the current speed of the vehicle to a CAN (Controller Area Network) bus.

Gyro sensor 40 is a sensor that detects the yaw angle speed information on the vehicle, and outputs a detection result. The orientation of the vehicle can be calculated by accumulating the above-described detection result.

Acceleration sensor 50 is a sensor that detects the acceleration of the vehicle, and outputs a detection result. Based on the above-described detection result, it can be determined whether or not the vehicle is stopped.

Video display device 60 is a device that displays the information based on the orientation of the vehicle, and is, for example, a HUD, an electronic mirror, or a car-navigation system, etc. In the present embodiment, video display device 60 is assumed to be an HUD. The information based on the orientation of the vehicle is, for example, an arrow extending in the direction of movement with the vehicle as the starting point (refer to FIG. 9 described later), etc. Video display device 60 displays the information based on the orientation of the vehicle, based on the information on the routes to the destination of the vehicle obtained from information processor 20, and the estimated orientation of the vehicle obtained from video control device 10. Note that the information based on the orientation of the vehicle may be the orientation of the vehicle itself. That is, the orientation of the vehicle may be displayed on video display device 60.

Video control device 10 is a device that calculates the estimated orientation of the vehicle, and outputs the estimated orientation to video display device 60. Since the display content (the information based on the orientation of the vehicle) of video display device 60 will be changed according to the estimated orientation calculated by video control device 10, it can be said that video control device 10 is a device that controls the display content of video display device 60. Video control device 10 includes first obtainer 11, second obtainer 12, orientation deviation estimator 13, orientation calculator 14, and outputter 15. Video control device 10 is a computer that includes a processor, a memory, and a communication circuit, etc. The memory is a ROM (Read Only Memory), a RAM (Random Access Memory), etc., and can store a program executed by the processor. Additionally, the information obtained by video control device 10 is stored in the memory. For example, when the processor operates according to the program, the functions of first obtainer 11, second obtainer 12, orientation deviation estimator 13, orientation calculator 14, and outputter 15 are achieved.

First obtainer 11 obtains the position of the vehicle determined by the satellite positioning system. Specifically, first obtainer 11 obtains the position of the vehicle determined by the satellite positioning system from information processor 20. First obtainer 11 obtains a first position of the vehicle determined by the satellite positioning system, and a second position of the vehicle determined by the satellite positioning system when the vehicle moves from the first position. First obtainer 11 can estimate the traveling path of the vehicle from the first position to the second position by successively obtaining the position of the vehicle determined by the satellite positioning system.

Second obtainer 12 obtains the estimated position of the vehicle estimated based on dead reckoning. For example, second obtainer 12 obtains the estimated position of the vehicle by estimating the estimated position of the vehicle at the time when the second position is determined (specifically, at the timing at which the second position was determined) based on the dead reckoning using the first position, the orientation of the vehicle at the first position, the detection result of gyro sensor 40 provided in the vehicle, and the speed information of the vehicle. The dead reckoning is the technology that does not directly determine the position as in the satellite positioning system, but relatively determines the position of a mobile body by using the orientation of the mobile body at a certain point, the detection result of the gyro sensor from the point, the speed information of the mobile body, etc. Second obtainer 12 can estimate the traveling path of the vehicle from the first position to the estimated position with the dead reckoning.

When the first position obtained by first obtainer 11 and the first position obtained by the second obtainer are the same, second obtainer 12 may obtain the first position from information processor 20, or may obtain the first position from first obtainer 11. Additionally, second obtainer 12 obtains the orientation of the vehicle at the first position from information processor 20 at the time of, for example, start-up of the vehicle (at the time of starting traveling). That is, the orientation of the vehicle at the first position obtained by second obtainer 12 at the time of starting traveling of the vehicle is the orientation of the vehicle determined by the satellite positioning system. Additionally, for example, after starting traveling of the vehicle, second obtainer 12 obtains the orientation of the vehicle at the first position from orientation calculator 14. In addition, second obtainer 12 obtains the detection result of gyro sensor 40 from gyro sensor 40, and obtains the speed information of the vehicle from ECU 30 via a CAN bus, etc. Further, second obtainer 12 is notified of, for example, the timing at which the second position is determined from first obtainer 11.

Here, using FIG. 2, a method of calculating the orientation of the vehicle with the detection result of gyro sensor 40 will be described.

Figure 2:
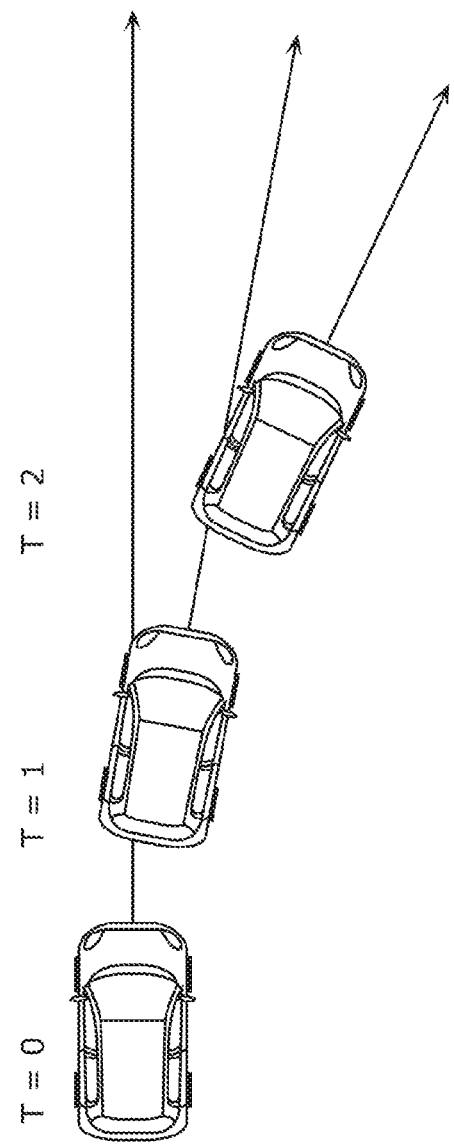
FIG. 2 is a diagram for describing a method of calculating the orientation of a vehicle by using a gyro sensor.

FIG. 2 is a diagram for describing a method of calculating the orientation of the vehicle by using gyro sensor 40.

For example, suppose that the orientation (initial orientation) of the vehicle at time T=0 is known. The orientation of the vehicle at time T=1 can be calculated by adding the accumulated value of the detection results of gyro sensor 40 (that is, the yaw angle speed) from time T=0 to time T=1 to the initial orientation. The orientation of the vehicle at time T=2 can be calculated by adding the accumulated value of the detection results of gyro sensor 40 from time T=1 to time T=2 to the orientation of the vehicle at time T=1. In this manner, when the orientation of the vehicle at a certain moment is known, the orientation of the vehicle can be correctly calculated by using the orientation of the vehicle at the moment, and the accumulated value of the detection results of gyro sensor 40. However, when a deviation is included in the initial orientation, the subsequent orientation of the vehicle calculated by using the initial orientation will also be correctly deviated for the amount of the deviation.

Additionally, even when the vehicle is in a stopped state, the zero point of gyro sensor 40 (the output of gyro sensor 40 at the time when the vehicle is in the stopped state) may not be zero due to gyro drift. In this case, the accumulated value of gyro sensor 40 will also be deviated. Therefore, the zero point of gyro sensor 40 is updated in such a case. This will be described by using FIG. 3.

Figure 3:
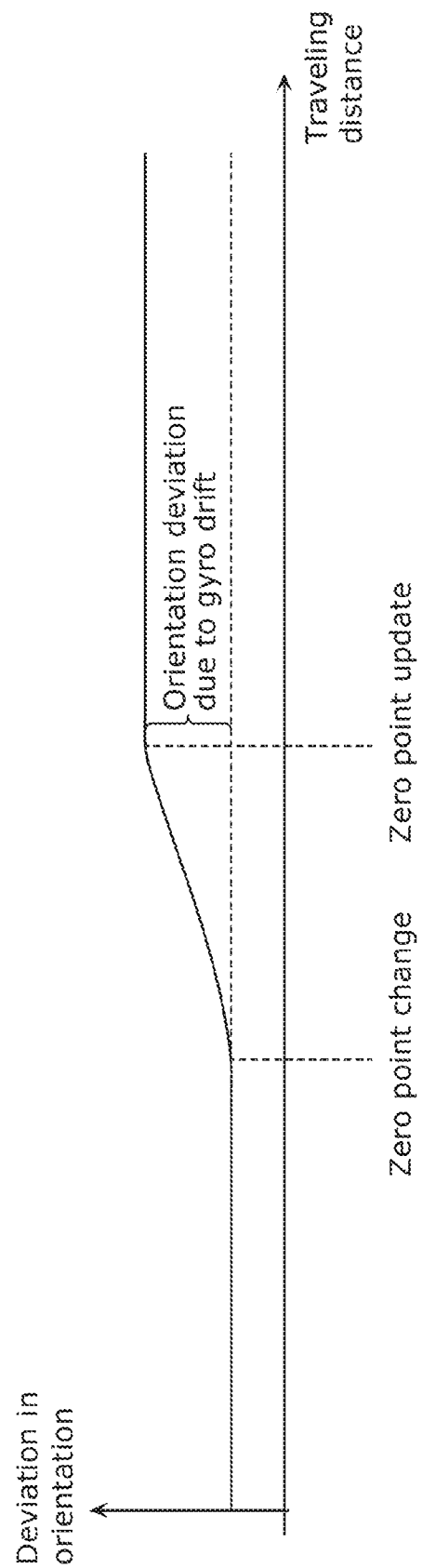
FIG. 3 is a diagram for describing updating of a zero point of the gyro sensor.

FIG. 3 is a diagram for describing the updating of the zero point of gyro sensor 40.

As shown in FIG. 3, when the vehicle continues traveling, the zero point of gyro sensor 40 will be changed from zero due to gyro drift from a certain time point. Since the change in the zero point of gyro sensor 40 changes the accumulated value of the detection results of gyro sensor 40, a deviation is generated in the orientation of the vehicle calculated by using gyro sensor 40, due to the change in the zero point of gyro sensor 40 (that is, due to gyro drift). Therefore, for example, second obtainer 12 performs the updating of the zero point. Specifically, when the vehicle is stopped (for example, when the vehicle speed is 0 for the past 3 seconds, and the amount of change in the acceleration of the vehicle is a predetermined threshold value or less), second obtainer 12 performs the updating of the zero point by setting the average of the detection results of gyro sensor 40 for the past 3 seconds to zero. Accordingly, it is possible to prevent the orientation of the vehicle from being further deviated. Second obtainer 12 obtains the acceleration of the vehicle from acceleration sensor 50. For example, when the vehicle is stopped, and the average of the detection results of gyro sensor 40 for the past 3 seconds is zero (that is, when the zero point is not changed), second obtainer 12 does not perform the updating of the zero point. In other words, second obtainer 12 performs the updating of the zero point when the change in the zero point can be confirmed.

Returning to the description of FIG. 1, orientation deviation estimator 13 estimates a deviation in the orientation of the vehicle, based on the position of the vehicle determined by the satellite positioning system, and the estimated position of the vehicle estimated based on the dead reckoning. The details of the operation of orientation deviation estimator 13 will be described later.

Orientation calculator 14 calculates the estimated orientation of the vehicle based on the deviation in the orientation of the vehicle estimated by orientation deviation estimator 13. The details of the operation of orientation calculator 14 will be described later.

Outputter 15 outputs the estimated orientation of the vehicle to video display device 60.

Next, the operation of video control device 10 will be described.

Figure 4:
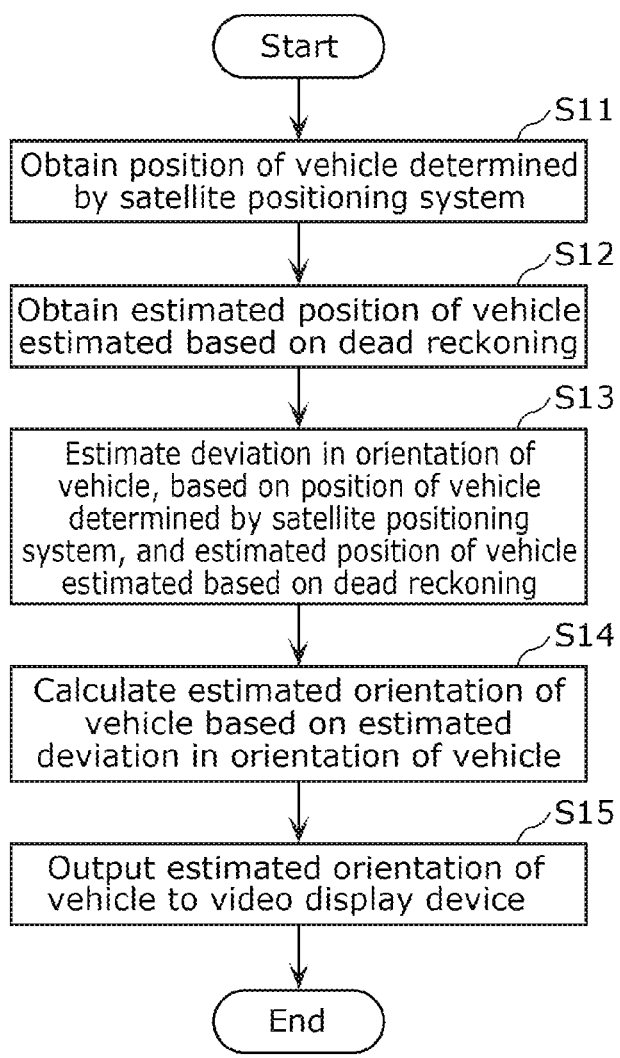
FIG. 4 is a flowchart showing an example of the operation of the video control device according to the embodiment.

FIG. 4 is a flowchart showing an example of the operation of video control device 10 according to an embodiment.

First obtainer 11 obtains the position of the vehicle determined by the satellite positioning system (step S11). Specifically, first obtainer 11 obtains the first position of the vehicle determined by the satellite positioning system, and the second position of the vehicle determined by the satellite positioning system when the vehicle moves from the first position.

Second obtainer 12 obtains the estimated position of the vehicle estimated based on the dead reckoning (step S12). The estimated position of the vehicle is the position of the vehicle at the time when the second position is determined, the estimated position being estimated based on the dead reckoning using the first position, the orientation of the vehicle at the first position, the detection result of gyro sensor 40 provided in the vehicle, and the speed information of the vehicle.

Orientation deviation estimator 13 estimates a deviation in the orientation of the vehicle, based on the position of the vehicle determined by the satellite positioning system, and the estimated position of the vehicle estimated based on the dead reckoning (step S13). Specifically, orientation deviation estimator 13 estimates the deviation in the orientation of the vehicle based on the first position of the vehicle determined by the satellite positioning system, the second position of the vehicle determined by the satellite positioning system when the vehicle moves from the first position, and the estimated position of the vehicle at the time when the second position is determined, the estimated position being estimated based on the dead reckoning using the first position, the orientation of the vehicle at the first position, the detection result of the gyro sensor provided in the vehicle, and the speed information of the vehicle. A method of estimating a deviation in the orientation of the vehicle will be described in detail by using FIG. 5.

Figure 5:
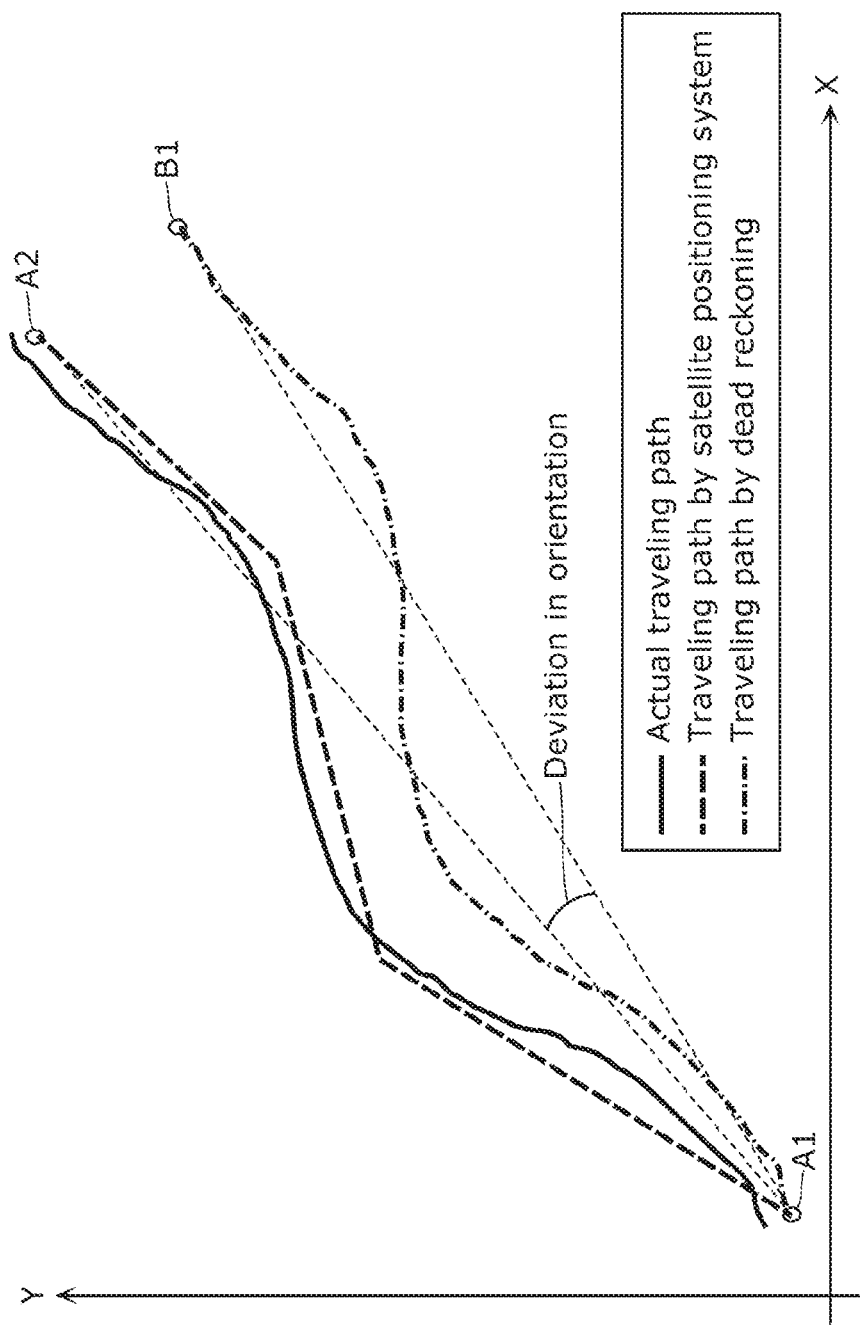
FIG. 5 is a diagram showing an example of a method of estimating a deviation in the orientation of a vehicle according to the embodiment.

FIG. 5 is a diagram showing an example of a method of estimating the deviation in the orientation of the vehicle according to an embodiment. FIG. 5 schematically shows a traveling path of the vehicle on a horizontal plane, and it is assumed that the vehicle moves to the upper right side (the plus side of the X-axis and the Y-axis) from the lower left side (the origin side). The solid line in FIG. 5 is an actual traveling path, and cannot be recognized by video control device 10, etc., but is shown for comparison with a traveling path by the satellite positioning system, and a traveling path by the dead reckoning. The broken line in FIG. 5 is the traveling path by the satellite positioning system. The one-dot-chain line in FIG. 5 is the traveling path by the dead reckoning.

A position A1 in FIG. 5 indicates the first position determined by the satellite positioning system, and a position A2 indicates the second position determined by the satellite positioning system when the vehicle moves from the position A1. Video control device 10 can recognize the traveling path by the satellite positioning system, by successively obtaining the position of the vehicle determined by the satellite positioning system. However, the position of the vehicle determined by the satellite positioning system includes an error, and may be determined with a deviation of about 10 meters from the actual traveling position.

A position B1 in FIG. 5 indicates the estimated position estimated by the dead reckoning when the position A2 is determined. Video control device 10 can recognize the traveling path by the dead reckoning, by obtaining the orientation (initial orientation) of the vehicle at the position A1, and successively obtaining the detection results of gyro sensor 40 from the position A1, and the speed information of the vehicle from the position A1. When the dead reckoning is accurately performed, since the change in the orientation of the vehicle and the change in the speed of the vehicle from a certain point can be correctly reflected to the traveling path, it can be found that the traveling path by the dead reckoning is similar in shape to the actual traveling path as shown in FIG. 5. However, when the initial orientation of the vehicle used by the dead reckoning is deviated from the actual orientation of the vehicle, the position of the traveling path by the dead reckoning is also deviated from the position of the actual traveling path by the amount of the deviation. The position A1 is the position at which the estimation processing of the deviation in the orientation of the vehicle is started, and is, for example, the starting position of traveling of the vehicle (the start-up position of the vehicle), or the updating position of the zero point of gyro sensor 40. When the position A1 is the starting position of traveling of the vehicle, the initial orientation is, for example, the orientation of the vehicle determined by the satellite positioning system. Since the accuracy of the orientation of the vehicle determined by the satellite positioning system is low, there is a high possibility that the initial orientation is deviated from the actual orientation of the vehicle. Additionally, when the position A1 is the updating position of the zero point of gyro sensor 40, the initial orientation is, for example, the orientation of the vehicle calculated based on the detection result of gyro sensor 40. Since the updating of the zero point of gyro sensor 40 is performed when the zero point of gyro sensor 40 is changed, there is a high possibility that the orientation (that is, the initial orientation) of the vehicle calculated based on the detection result of gyro sensor 40 at the time of the updating of the zero point of gyro sensor 40 is deviated from the actual orientation of the vehicle.

It is assumed that, at the starting position of traveling of the vehicle or the updating position of the zero point of gyro sensor 40, the updating of the zero point of gyro sensor 40 is performed, and the zero point of gyro sensor 40 is not changed. Additionally, it is assumed that the vehicle is stopped at these positions, and for a while after the vehicle starts moving from these positions, there is no change in the zero point of gyro sensor 40 due to gyro drift. In this manner, it is assumed that, while the vehicle moves from the position A1 to the position A2 determined by the satellite positioning system, the deviation in the orientation of the vehicle is not changed from the deviation generated at the position A1.

Under the assumption that the dead reckoning is accurately performed, and the deviation in the orientation of the vehicle is not changed during movement for estimation of the deviation in the orientation of the vehicle, it is possible to consider, as the deviation in the orientation of the vehicle, the angle formed by a straight line connecting the position A1 and the position A2 and a straight line connecting the position A1 and the position B1. That is, orientation deviation estimator 13 can estimate the deviation in the orientation of the vehicle determined by the satellite positioning system, or the deviation in the orientation of the vehicle due to gyro drift, etc.

Returning to the description of FIG. 4, orientation calculator 14 calculates the estimated orientation of the vehicle, based on the deviation in the orientation of the vehicle estimated by orientation deviation estimator 13 (step S14). For example, orientation calculator 14 calculates the estimated orientation of the vehicle by correcting the orientation of the vehicle (for example, by adding or subtracting the deviation in the orientation of the vehicle) calculated based on the detection result of gyro sensor 40 in the movement after the position A2, by using the estimated deviation in the orientation of the vehicle. Accordingly, the accuracy of estimation of the orientation of the vehicle can be increased.

Then, outputter 15 outputs the estimated orientation of the vehicle to video display device 60 (step S15). Accordingly, video display device 60 can display the information based on the orientation of the vehicle, based on the orientation of the vehicle with less deviation.

Note that, even after estimating the deviation in the orientation of the vehicle, and the estimated orientation of the vehicle is calculated, orientation deviation estimator 13 may subsequently and successively estimate the deviation in the orientation of the vehicle with the position A1 as the starting point. This is because the longer the distance the vehicle moves for estimating the deviation in the orientation of the vehicle, the higher the accuracy of estimation of the deviation in the orientation of the vehicle becomes, although the details will be described with FIG. 6 described later. However, when the distance the vehicle travels without stopping becomes long, since the deviation in the orientation of the vehicle due to gyro drift (that is, the change in the zero point of gyro sensor 40) is generated, when the zero point of gyro sensor 40 is changed and updating of the zero point is performed, the estimation processing of the deviation in the orientation of the vehicle is performed with a new first position that replaces the position A1 as the starting point.

As shown in FIG. 5, since an error is included in the position of the vehicle determined by the satellite positioning system, and the larger the error is, the more shifted the straight line connecting the position A1 and the position A2 becomes, the accuracy of estimation of the deviation in the orientation of the vehicle becomes low. On the other hand, the longer the distance between the position A1 and the position A2 (the distance the vehicle moves for estimating the deviation in the orientation of the vehicle), the less the above-described error affects the estimation of the deviation in the orientation of the vehicle. However, the deviation in the orientation of the vehicle is calculated under the assumption that the dead reckoning is accurately performed, and the deviation in the orientation of the vehicle is not changed during the movement for estimation of the deviation in the orientation of the vehicle, and actually, when the distance the vehicle moves becomes long, the accuracy of the dead reckoning may be decreased, or may be affected by gyro drift. Therefore, in order to maintain the above-described assumption, it is necessary to make the distance the vehicle moves as short as possible.

Therefore, orientation deviation estimator 13 may perform the estimation processing of the orientation of the vehicle in each short interval of, for example, about 10 m, and orientation calculator 14 may calculate the estimated orientation of the vehicle from the estimation result of the orientation of the vehicle in each interval. Specifically, orientation deviation estimator 13 may estimate the deviation in the orientation of the vehicle for each of a plurality of consecutive intervals, based on the first position, the second position, and the estimated position in each of the plurality of consecutive intervals. Additionally, orientation calculator 14 may calculate the estimated orientation of the vehicle based on the deviation in the orientation of the vehicle in two or more intervals among the plurality of consecutive intervals. This will be described by using FIG. 6.

Figure 6:
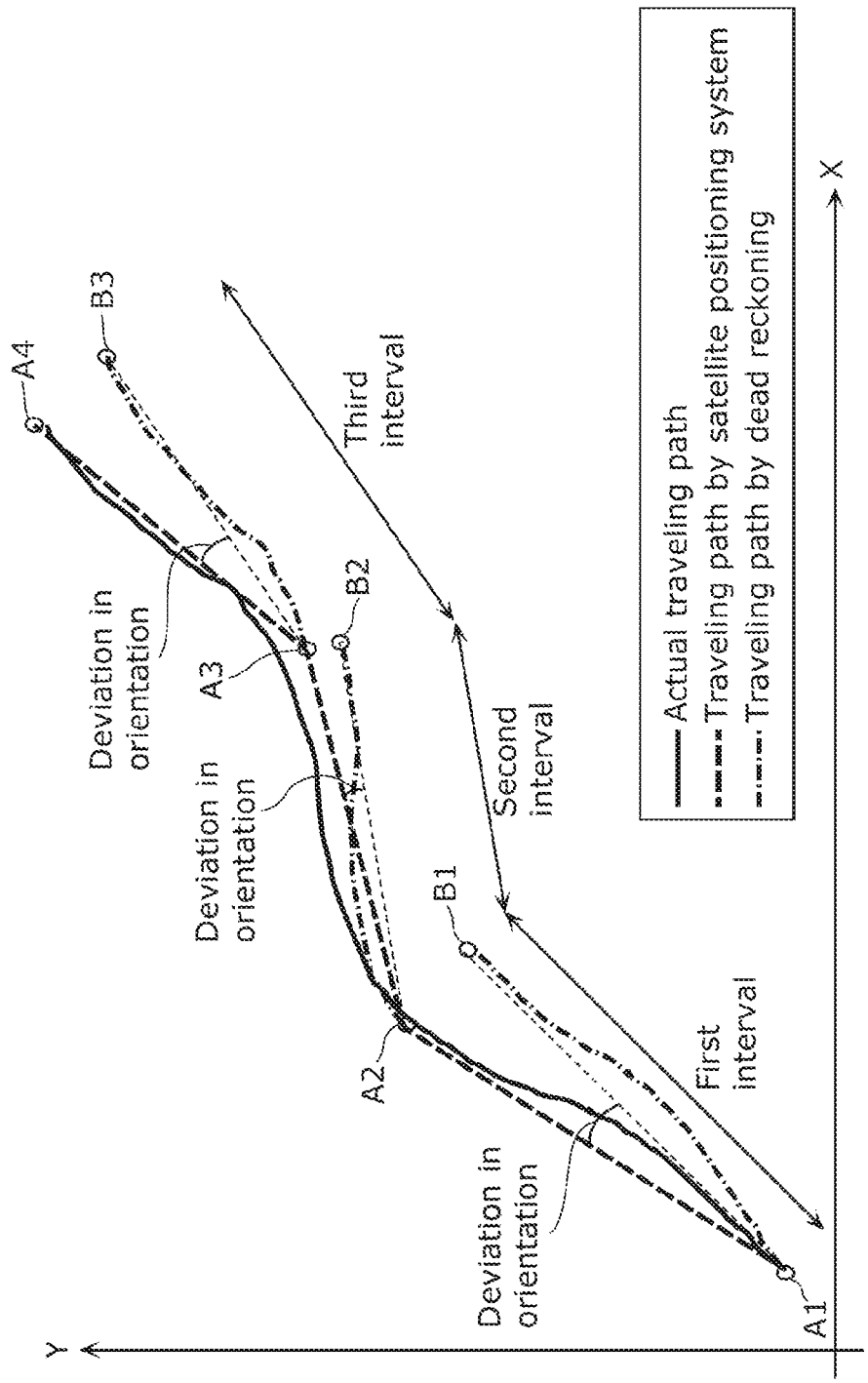
FIG. 6 is a diagram showing another example of a method of estimating the deviation in the orientation of the vehicle according to the embodiment.

FIG. 6 is a diagram showing another example of a method of estimating the deviation in the orientation of the vehicle according to an embodiment. As in FIG. 5, FIG. 6 schematically shows a traveling path of the vehicle on a horizontal plane, and it is assumed that the vehicle moves to the upper right side (the plus side of the X-axis and the Y-axis) from the lower left side (the origin side). However, in FIG. 6, the first position, the second position, and the estimated position exist for each of the plurality of consecutive intervals (here, three intervals, a first interval to a third interval, are shown as an example). That is, the estimation processing of the deviation in the orientation of the vehicle using the first position (the position A1), the second position (the position A2), and the estimated position (the position B1) in FIG. 5 is performed for each of the first interval to the third interval. In the first interval, the position A1 indicates the first position determined by the satellite positioning system, the position A2 indicates the second position determined by the satellite positioning system when the vehicle moves from the position A1, and the position B1 indicates the estimated position estimated by the dead reckoning when the position A2 is determined. Additionally, in the second interval, the position A2 indicates the first position determined by the satellite positioning system, a position A3 indicates the second position determined by the satellite positioning system when the vehicle moves from the position A2, and a position B2 indicates the estimated position estimated by the dead reckoning when the position A3 is determined. In addition, in the third interval, the position A3 indicates the first position determined by the satellite positioning system, a position A4 indicates the second position determined by the satellite positioning system when the vehicle moves from the position A3, and a position B3 indicates the estimated position estimated by the dead reckoning when the position A4 is determined.

Here, as an example, although the example is shown in which the estimation of the deviation in the orientation of the vehicle is performed for the three intervals, the deviation in the orientation of the vehicle is estimated for each interval by dividing a distance of, for example, several hundred meters into short intervals of about 10 m. In the short interval of about 10 m, it becomes easy to secure the assumption that the dead reckoning is accurately performed, and the deviation in the orientation of the vehicle is not changed during the movement for estimation of the deviation in the orientation of the vehicle. However, since each interval is short, the deviation in the orientation of the vehicle estimated in each interval tends to be large, by being greatly affected by the error in the position of the vehicle determined by the satellite positioning system. Note that the distance of each interval is not limited to 10 m, and may be about 20 m or 30 m.

On the other hand, orientation calculator 14 reduces the influence of the error in the position of the vehicle determined by the satellite positioning system, by using the deviation in the orientation of the vehicle in two or more intervals among the plurality of consecutive intervals. For example, by calculating the average or median, etc., of the orientations of the vehicle for two or more intervals, even when the deviation in the orientation of the vehicle estimated in each interval is large, the accuracy of estimation of the orientation of the vehicle can be further increased.

For example, orientation calculator 14 may calculate the estimated orientation of the vehicle, based on the average of the deviations in the orientations of the vehicle in the plurality of consecutive intervals other than an interval in which the orientation of the vehicle calculated based on the detection result of gyro sensor 40 has changed by a first threshold value or more, with respect to the orientation of the vehicle calculated based on the detection result of gyro sensor 40 in an adjacent preceding interval, among the plurality of consecutive intervals.

For example, in the example of FIG. 6, for the adjacent first interval and second interval, the first interval serves as an adjacent preceding interval for the second interval, and for the adjacent second interval and third interval, the second interval serves as an adjacent preceding interval for the third interval. For example, for the adjacent first interval and second interval, assume that the orientation of the vehicle calculated based on the detection result of gyro sensor 40 in the first interval (the preceding interval) is the North. Additionally, assume that the orientation of the vehicle calculated based on the detection result of gyro sensor 40 in the second interval (the subsequent interval) is the East. In this case, since the orientation of the vehicle is changed by about 90 degrees in a distance of, for example, about 10 m, there is a high possibility that a steep curve or a right/left turn road exists in the vicinity of the second interval, and there is a high possibility that the accuracy of determination by the satellite positioning system or the accuracy of the dead reckoning is not enough. Therefore, the average of the deviations in the orientations of the vehicle in the plurality of consecutive intervals other than an interval in which the orientation of the vehicle calculated based on the detection result of gyro sensor 40 is changed by the first threshold value or more, with respect to the orientation of the vehicle calculated based on the detection result of gyro sensor 40 in the adjacent preceding interval, among the plurality of consecutive intervals, is calculated. Since the average is calculated by excluding the deviation in the orientation of the vehicle estimated in the interval with a high possibility that the accuracy of determination by the satellite positioning system or the accuracy of the dead reckoning is not enough, the accuracy of estimation of the orientation of the vehicle can be further increased. Note that, although the example has been described in which the first threshold value is, for example, 90 degrees, the first threshold value is not particularly limited, and is appropriately set.

Additionally, for example, orientation calculator 14 may calculate the estimated orientation of the vehicle, based on the average of the deviations in the orientations of the vehicle in the plurality of consecutive intervals other than an interval in which the deviation in the orientation of the vehicle is a second threshold value or more, among the plurality of consecutive intervals.

For example, the deviation in the estimated orientation of the vehicle may be large (for example, 20 degrees, etc.) in a certain interval among a plurality of consecutive intervals. In such an interval, the operation of the satellite positioning system is unstable, and there is a high possibility that the second position of the vehicle determined by the satellite positioning system is greatly deviated from the actual position. Therefore, the average of the deviations in the orientations of the vehicle in the plurality of consecutive intervals other than an interval in which the deviation in the orientation of the vehicle is the second threshold value or more, among the plurality of consecutive intervals, is calculated. Since the average is calculated by excluding the deviation in the orientation of the vehicle estimated in the interval with a high possibility that the operation of the satellite positioning system is unstable, the accuracy of estimation of the orientation of the vehicle can be further increased. Note that, although the example has been described in which the second threshold value is, for example, 20 degrees, the second threshold value is not particularly limited, and is appropriately set.

Note that orientation calculator 14 may calculate the estimated orientation of the vehicle, based on the average of the deviations in the orientation of the vehicle in the plurality of consecutive intervals other than both the interval in which the orientation of the vehicle calculated based on the detection result of gyro sensor 40 is changed by the first threshold value or more, with respect to the orientation of the vehicle calculated based on the detection result of gyro sensor 40 in the adjacent preceding interval, and the interval in which the deviation in the orientation of the vehicle is the second threshold value or more.

Additionally, for example, orientation calculator 14 may calculate the estimated orientation of the vehicle, based on the median of the deviation in the orientation of the vehicle for each of the plurality of consecutive intervals.

The deviation in the orientation of the vehicle in the interval in which the accuracy of determination by the satellite positioning system or the accuracy of the dead reckoning is not enough (for example, the interval excluded when calculating the average in the above-described description) may be an abnormal value with respect to the deviations in the orientations of the vehicle in other intervals. When the average is calculated by also including such an abnormal value, there is a possibility that the average is greatly affected by the abnormal value and does not become a normal value. Therefore, the accuracy of estimation of the orientation of the vehicle can be further increased by calculating the median.

Additionally, for example, orientation calculator 14 may calculate the estimated orientation of the vehicle, based on the weighted average of the deviations in the orientations of the vehicle in the plurality of consecutive intervals.

For example, by calculating the weighted average by reducing (setting, for example, 0.5, etc., to) the weight for the deviation in the orientation of the vehicle in the interval in which the accuracy of determination by the satellite positioning system or the accuracy of the dead reckoning is not enough (for example, the interval excluded when calculating the average in the above-described description), the accuracy of estimation of the orientation of the vehicle can be further increased.

Although outputter 15 outputs, to video display device 60, the estimated orientation of the vehicle calculated in this manner, in video display device 60, when displaying the information based on the orientation of the vehicle based on the estimated orientation of the vehicle on video display device 60, a drawing delay of, for example, about 33.3 ms is generated. That is, even when the estimated orientation is accurately calculated in video control device 10, the information based on the orientation of the vehicle based on the estimated orientation of the vehicle of approximately 33.3 ms ago will be displayed on video display device 60. Therefore, outputter 15 may output, to video display device 60, the future estimated orientation of the vehicle predicted based on the past amount of change in the estimated orientation of the vehicle. This will be described by using FIG. 7.

Figure 7:
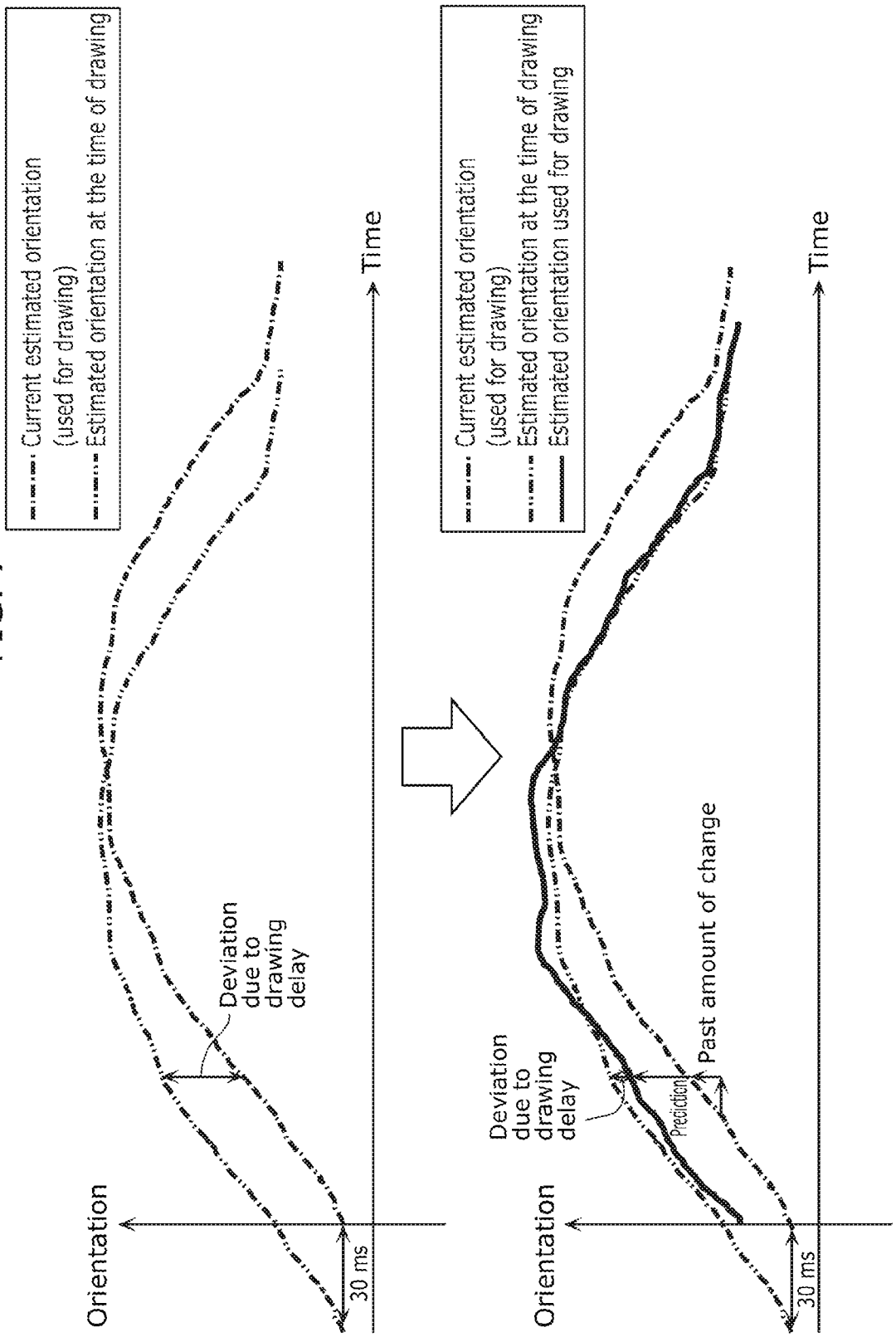
FIG. 7 is a diagram for describing a method of eliminating drawing delay according to the embodiment.

FIG. 7 is a diagram for describing a method of eliminating drawing delay according to an embodiment.

As shown in the upper side of FIG. 7, when the current estimated orientation (the one-dot-chain line in FIG. 7) is output to video display device 60, the information based on the orientation of the vehicle based on the current estimated orientation will be displayed on video display device 60 after approximately 33.3 ms. However, since the orientation of the vehicle is changed from moment to moment, at the time of drawing (that is, approximately 33.3 ms after the present time), the orientation of the vehicle may be different from the current orientation (the two-dot chain line in FIG. 7), and the deviation in the orientation of the vehicle due to the drawing delay may be generated.

Therefore, as shown in the lower side of FIG. 7, outputter 15 predicts and outputs, to video display device 60, the future estimated orientation of the vehicle (the solid line in FIG. 7), based on the past amount of change in the estimated orientation of the vehicle calculated so far, without outputting the estimated orientation of the vehicle to video display device 60 as it is. For example, outputter 15 predicts the estimated orientation of the vehicle after approximately 33.3 ms, based on the amount of change from approximately 16.6 ms ago to the present time. Accordingly, since the difference between the predicted estimated orientation used for drawing and the estimated orientation at the time of drawing is reduced, the deviation in the orientation of the vehicle due to the drawing delay is reduced. That is, the information based on the orientation of the vehicle will be correctly displayed on video display device 60.

Next, using FIG. 8, the transition of the deviation in the orientation in a case where video control device 10 according to the present embodiment is applied will be described.

Figure 8:
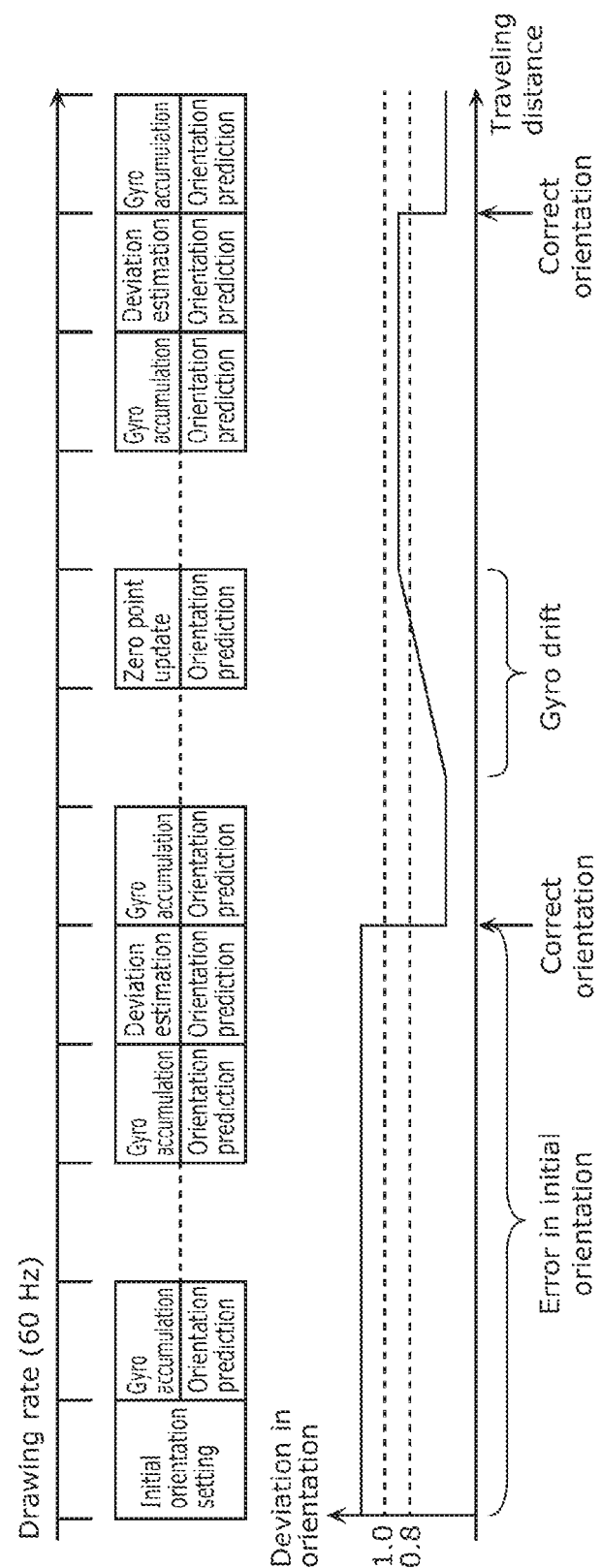
FIG. 8 is a diagram showing a transition of a deviation in orientation in the case where the video control device according to the embodiment is applied.

FIG. 8 is a diagram showing the transition of the deviation in the orientation in the case where video control device 10 according to the embodiment is applied. For example, in the present embodiment, the error in the orientation of the vehicle can be generally decreased by estimating the deviation in the orientation of the vehicle, and performing correction of the orientation of the vehicle.

As shown in FIG. 8, it is assumed that the orientation of the vehicle is predicted by performing accumulation of the detection results of gyro sensor 40 at, for example, the same frequency as the 60 Hz drawing rate. For example, the orientation of the vehicle determined by the satellite positioning system is used as the initial orientation at the time of start-up of the vehicle. The accuracy of the orientation of the vehicle determined by the satellite positioning system is low, and an error in the initial orientation is included in the orientation of the vehicle calculated based on the detection result of gyro sensor 40, until the estimation of the deviation in the orientation of the vehicle is performed, and the orientation of the vehicle is corrected.

After the vehicle starts moving, the deviation in the orientation of the vehicle is estimated based on the position of the vehicle determined by the satellite positioning system, and the estimated position of the vehicle estimated based on the dead reckoning. Then, the orientation of the vehicle is corrected based on the estimated deviation in the orientation of the vehicle. Accordingly, the error in the orientation of the vehicle can be made to be 0.8 degrees or less, for example.

Thereafter, when the vehicle continues traveling for a certain period of time, the deviation in the orientation of the vehicle may become large due to gyro drift. Therefore, the vehicle stops once, and the correction of the zero point of gyro sensor 40 is performed, so as to prevent the deviation in the orientation of the vehicle from becoming larger. Then, the deviation in the orientation of the vehicle is estimated again, based on the position of the vehicle determined by the satellite positioning system, and the estimated position of the vehicle estimated based on the dead reckoning, and the orientation of the vehicle is corrected based on the estimated deviation in the orientation of the vehicle. Accordingly, the error in the orientation of the vehicle can be made to be 0.8 degrees or less again. Subsequently, for example, when the zero point of gyro sensor 40 is changed and the correction of the zero point of gyro sensor 40 is performed, the estimation processing of the deviation in the orientation of the vehicle is performed so that the error in the orientation of the vehicle is reduced.

Since the accuracy of estimation of the orientation of the vehicle is increased as described above, the information based on the orientation of the vehicle can be correctly displayed on video display device 60.

Figure 9:
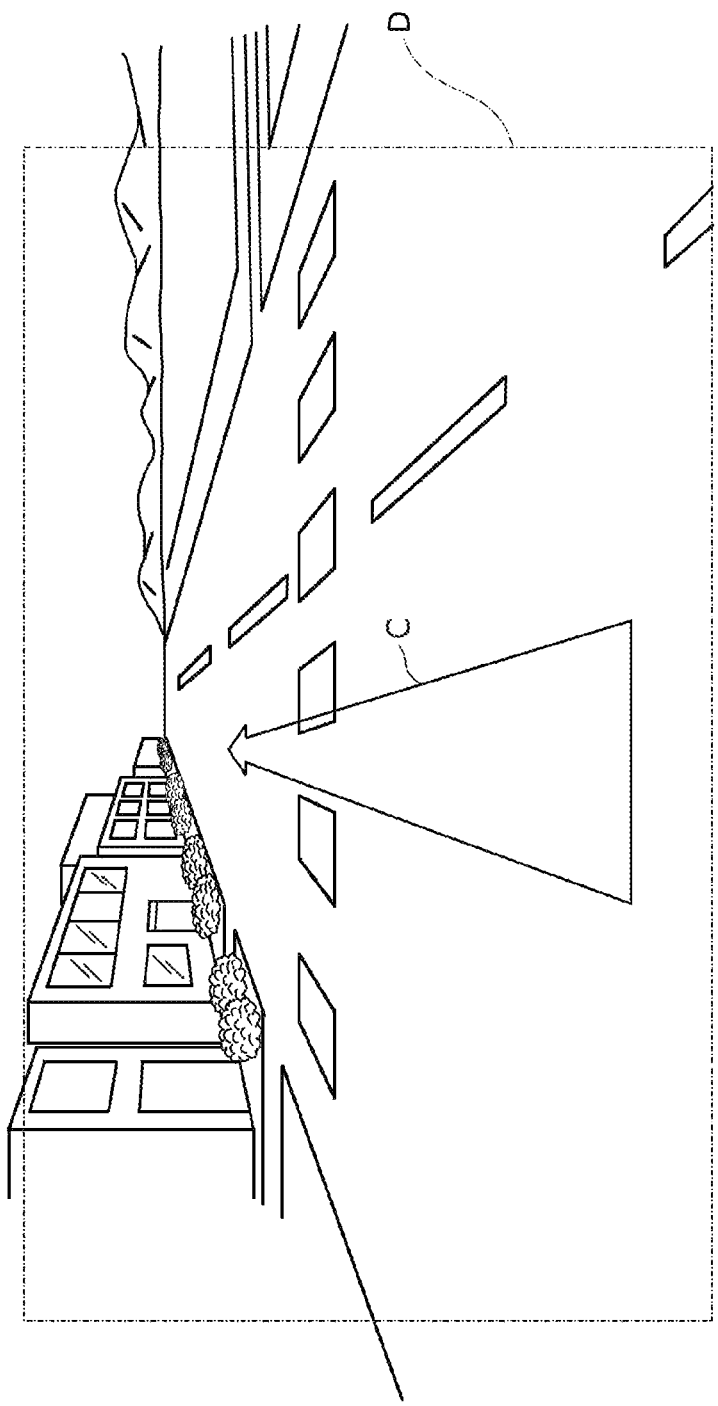
FIG. 9 is a diagram showing an example of a display of the video display device.

FIG. 9 is a diagram showing an example of the display of video display device 60. As described above, video display device 60 is, for example, a HUD, and a display area D on a front windshield glass of the vehicle is shown in FIG. 9 as a display area of video display device 60.

The information based on the orientation of the vehicle is, for example, an arrow C extending in the direction of movement with the own vehicle as the starting point. In order to display, on the display area D, the arrow C extending in the direction of movement with the own vehicle as the starting point, it is necessary to estimate the orientation of the vehicle. When the estimated orientation of the vehicle is deviated from the actual orientation, the arrow C may be displayed to protrude from a road (for example, such that the vehicle heads for a sidewalk or a building, etc.). In video control device 10 according to the present embodiment, since the accuracy of estimation of the orientation of the vehicle can be increased, it is possible to display the arrow C to point to the direction of movement of the vehicle.

As described above, video control device 10 according to the present embodiment includes: first obtainer 11 that obtains a position of a vehicle determined by a satellite positioning system; second obtainer that obtains an estimated position of the vehicle estimated based on dead reckoning; orientation deviation estimator 13 that estimates a deviation in an orientation of the vehicle, based on the position of the vehicle determined by the satellite positioning system and the estimated position of the vehicle estimated based on the dead reckoning; orientation calculator 14 that calculates an estimated orientation of the vehicle, based on the deviation in the orientation of the vehicle estimated; and outputter 15 that outputs the estimated orientation of the vehicle to video display device 60 that displays information which is based on the orientation of the vehicle.

According to the satellite positioning system, not only the position of the vehicle, but also the orientation of the vehicle can be determined from the time change in the position of the vehicle. However, since the determination by the satellite positioning system is only performed at a frequency of 1 Hz (once in approximately 1 s), and a communication delay also exists when obtaining the determined orientation of the vehicle, although the orientation of the vehicle is changed from moment to moment during the movement of the vehicle, the information based on the orientation of the vehicle will be displayed on the video display device, based on the greatly delayed orientation of the vehicle.

Therefore, in the present aspect, the deviation in the orientation of the vehicle is estimated based on the position of the vehicle determined by the satellite positioning system, and the estimated position of the vehicle estimated based on the dead reckoning. The position of the vehicle determined by the satellite positioning system will be close to the actual position of the vehicle, although a certain degree of error is generated. On the other hand, in the estimated position of the vehicle estimated based on the dead reckoning, when a deviation is generated in the orientation of the vehicle used for the dead reckoning, the deviation will be reflected to the estimated position with some degree of accuracy. That is, since the deviation between the position of the vehicle determined by the satellite positioning system, and the estimated position of the vehicle estimated based on the dead reckoning is correlated to the deviation in the orientation of the vehicle, the deviation in the orientation of the vehicle can be estimated from the deviation between the position of the vehicle determined by the satellite positioning system, and the estimated position of the vehicle estimated based on the dead reckoning. Accordingly, the accuracy of estimation of the orientation of the vehicle can be increased.

Furthermore, orientation deviation estimator 13 may estimate the deviation in the orientation of the vehicle based on: a first position of the vehicle determined by the satellite positioning system; a second position of the vehicle determined by the satellite positioning system when the vehicle moves from the first position; and an estimated position of the vehicle when the second position is determined. The estimated position is estimated based on dead reckoning using (i) the first position, (ii) an orientation of the vehicle at the first position, (iii) a detection result of gyro sensor 40 provided in the vehicle, and (iv) speed information of the vehicle. Specifically, orientation deviation estimator 13 may estimate, as the deviation in the orientation of the vehicle, an angle formed by a straight line connecting the first position and the second position and a straight line connecting the first position and the estimated position.

The first position and the second position will be positions close to the actual position of the vehicle. The estimated position is the position estimated based on the dead reckoning using the detection results of the gyro sensor on the basis of the orientation of the vehicle at the first position, etc. As the vehicle moves from the first position to the second position, the traveling path of the vehicle based on the dead reckoning is deviated from the traveling path from the first position to the second position of the vehicle determined by the satellite positioning system, by the amount of deviation in the orientation of the vehicle at the first position. In this manner, since the deviation between the second position of the vehicle determined by the satellite positioning system, and the estimated position of the vehicle estimated based on the dead reckoning corresponds to the deviation in the orientation of the vehicle at the first position, the deviation in the orientation of the vehicle can be estimated from the deviation between the second position and the estimated position. Specifically, since the angle formed by the straight line connecting the first position and the second position and the straight line connecting the first position and the estimated position can be considered as the deviation in the orientation of the vehicle at the first position, the deviation in the orientation of the vehicle can be easily estimated by calculating the angle.

Furthermore, orientation deviation estimator 13 may estimate the deviation in the orientation of the vehicle, for each of consecutive intervals, based on the first position, the second position, and the estimated position in the consecutive interval. Orientation calculator 14 may calculate the estimated orientation of the vehicle, based on the deviations in the orientations of the vehicle in two or more intervals among the consecutive intervals.

For example, by calculating the average or median, etc., of the deviations in the orientations of the vehicle in two or more intervals among the respective deviations of the orientations of the vehicle in a plurality of consecutive intervals, the accuracy of estimation of the orientation of the vehicle can be further increased.

Furthermore, orientation calculator 14 may calculate the estimated orientation of the vehicle, based on an average of the deviations in the orientations of the vehicle in the consecutive intervals other than an interval in which the orientation of the vehicle calculated based on a detection result of gyro sensor 40 has changed by a first threshold value or more with respect to the orientation of the vehicle calculated based on a detection result of gyro sensor 40 in an adjacent preceding interval, among the consecutive intervals.

In the interval in which the orientation of the vehicle is changed by the first threshold value or more with respect to an adjacent preceding interval, there is a high possibility that a steep curve or a right/left turn road exists, and there is a high possibility that the accuracy of determination by the satellite positioning system or the accuracy of the dead reckoning is not enough. Therefore, by calculating the average of the deviations in the orientations of the vehicle in the plurality of consecutive intervals other than such an interval, the accuracy of estimation of the orientation of the vehicle can be further increased.

Furthermore, orientation calculator 14 may calculate the estimated orientation of the vehicle, based on an average of the deviations in the orientations of the vehicle in consecutive intervals other than an interval in which a deviation in the orientation of the vehicle is a second threshold value or more, among the consecutive intervals.

In the interval in which the estimated deviation in the orientation of the vehicle is the second threshold value or more, the operation of the satellite positioning system is unstable, and there is a high possibility that the second position of the vehicle determined by the satellite positioning system is greatly deviated from the actual position. Therefore, by calculating the average of the deviations in the orientations of the vehicle in the plurality of consecutive intervals other than such an interval, the accuracy of estimation of the orientation of the vehicle can be further increased.

Furthermore, orientation calculator 14 may calculate the estimated orientation of the vehicle, based on a median of the deviations in the orientations of the vehicle in the consecutive intervals.

According to this, since it is possible to suppress the influence of the deviation in the orientation of the vehicle in an interval in which the accuracy of determination by the satellite positioning system or the accuracy of the dead reckoning is not enough (the so-called outlier), among the respective deviations in the orientations of the vehicle in the plurality of consecutive intervals, the accuracy of estimation of the orientation of the vehicle can be further increased.

Furthermore, orientation calculator 14 may calculate the estimated orientation of the vehicle, based on a weighted average of the deviations in the orientations of the vehicle in the consecutive intervals.

According to this, by calculating the weighted average by reducing the weight for the deviation in the orientation of the vehicle in an interval in which the accuracy of determination by the satellite positioning system or the accuracy of the dead reckoning is not enough, among the respective deviations in the orientations of the vehicle in the plurality of consecutive intervals, since the influence of the deviation in the orientation of the vehicle in the interval can be suppressed, the accuracy of estimation of the orientation of the vehicle can be further increased.

Furthermore, outputter 15 may output, to the video display device, a future estimated orientation of the vehicle which is predicted based on a past amount of change in the estimated orientation of the vehicle.

When displaying the information based on the orientation of the vehicle on video display device 60, a drawing delay of about 33.3 ms is generated. Therefore, when the estimated orientation of the vehicle is output to video display device 60 as it is, although the orientation of the vehicle is changed from moment to moment, the information based on the orientation of the vehicle will be displayed on video display device 60 based on the estimated orientation of the vehicle of approximately 33.3 ms ago. Therefore, by predicting and outputting, to video display device 60, the future estimated orientation of the vehicle (after approximately 33.3 ms) based on the past amount of change in the estimated orientation of the vehicle calculated so far (for example, the amount of change from approximately 16.6 ms ago to the present time), the influence of the drawing delay can be suppressed, and the information based on the correct orientation of the vehicle can be displayed on video display device 60.

Other Embodiments

As described above, an embodiment is described as an example of the techniques according to the present disclosure. However, the techniques according to the present disclosure are not limited to the above embodiment, and may also be applied to an embodiment obtained through suitable modification, substitution, addition, omission, etc. For example, variations such as those described below are also included in an embodiment of the present disclosure.

For example, video control device 10 is exemplified as being provided separately from information processor 20 and video display device 60 in the forgoing embodiment, but is not limited to such example. For example, video control device 10 may be provided integrally with information processor 20, or may be provided integrally with video display device 60, or video control device 10, information processor 20, and video display device 60 may be provided integrally as a single unit.

For example, the vehicle is described as an automobile in the forgoing embodiment but is not limited to an automobile, and may be a two-wheeled vehicle, a construction vehicle, a farm vehicle, etc.

It should be noted that the present disclosure can be implemented not only as video control device 10, but also as a video control method including steps (processes) performed by respective structural components included in video control device 10.

Specifically, as shown in FIG. 4, video control method includes: obtaining a position of a vehicle determined by a satellite positioning system (step S11); obtaining an estimated position of the vehicle estimated based on dead reckoning (step S12); estimating a deviation in an orientation of the vehicle, based on the position of the vehicle determined by the satellite positioning system and the estimated position of the vehicle estimated based on the dead reckoning (step S13); calculating an estimated orientation of the vehicle, based on the deviation in the orientation of the vehicle estimated (step S14); and outputting the estimated orientation of the vehicle to video display device 60 that displays information which is based on the orientation of the vehicle (step S15).

For example, steps included in the video control method may be implemented by a computer (computer system). In addition, the present disclosure can be implemented as a program for causing to execute the steps included in the video control method. Moreover, the present disclosure can be implemented as a non-transitory computer-readable recording medium, such as a CD-ROM, on which the program is recorded.

For example, when the present disclosure is implemented as a program (software), the respective steps are executed by the program being executed using hardware resources such as a CPU, memory, input/output circuit, and so on, of the computer. Specifically, the respective steps are executed by the CPU obtaining data from the memory or input/output circuit and performing an operation, and outputting the operation result to the memory or the input/output circuit.

Furthermore, the respective structural components included in video control device 10 in the forgoing embodiment may be implemented as dedicated or general-purpose circuits.

Furthermore, the respective structural components included in video control device 10 in the forgoing embodiments may be implemented as a large-scale integration (LSI) which is an integrated circuit (IC).

Furthermore, such IC is not limited to an LSI, and may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Furthermore, when a circuit integration technology that replaces LSIs comes along owing to advances in semiconductor technology or to a separate derivative technology, the respective structural elements included in video control device 10 may be integrated using such technology.

Forms obtained by various modifications to the foregoing embodiments that can be conceived by a skilled person, and forms realized by arbitrarily combining structural elements and functions of respective embodiments without departing from the essence of the present disclosure are included in the present disclosure.

FURTHER INFORMATION ABOUT TECHNICAL BACKGROUND TO THIS APPLICATION

The disclosures of the following patent applications including specification, drawings and claims are incorporated herein by reference in their entirety: Japanese Patent Application No. 2019-116243 filed on Jun. 24, 2019 and PCT International Application No. PCT/JP2020/015238 filed on Apr. 2, 2020.

INDUSTRIAL APPLICABILITY

The present disclosure can be applied to a device that displays information which is based on the orientation of a vehicle, for example.

The invention claimed is:

1. A video control device, comprising:
a processor; and
a memory including a program that, when executed, causes the processor to perform operations, the operations including:
obtaining positions of a vehicle determined by a satellite positioning system;
obtaining an estimated position of the vehicle estimated based on dead reckoning;
estimating a deviation in an orientation of the vehicle, based on the positions of the vehicle determined by the satellite positioning system and the estimated position of the vehicle estimated based on the dead reckoning;
calculating an estimated orientation of the vehicle, based on the deviation in the orientation of the vehicle estimated; and
outputting the estimated orientation of the vehicle to a video display device that displays information which is based on the estimated orientation of the vehicle,
wherein the deviation in the orientation of the vehicle is estimated based on:
a first position of the vehicle determined by the satellite positioning system;
a second position of the vehicle determined by the satellite positioning system when the vehicle moves from the first position; and
the estimated position of the vehicle, which is obtained when the second position is determined and is estimated based on the dead reckoning, using (i) the first position, (ii) an orientation of the vehicle at the first position, (iii) a detection result of a gyro sensor provided in the vehicle, and (iv) speed information of the vehicle.

2. The video control device according to claim 1, wherein an angle formed by a first straight line connecting the first position and the second position and a second straight line connecting the first position and the estimated position is estimated as the deviation in the orientation of the vehicle.

3. The video control device according to claim 1, wherein the deviation in the orientation of the vehicle is estimated, for each of consecutive intervals, based on the first position, the second position, and the estimated position in each of the consecutive intervals, and
the estimated orientation of the vehicle is calculated based on deviations in orientations of the vehicle in two or more intervals among the consecutive intervals.

4. The video control device according to claim 3, wherein the estimated orientation of the vehicle is calculated based on an average of the deviations in the orientations of the vehicle in the consecutive intervals other than an interval in which an orientation of the vehicle calculated based on the detection result of the gyro sensor has changed by a first threshold value or more with respect to the orientation of the vehicle calculated based on the detection result of the gyro sensor in an adjacent preceding interval, among the consecutive intervals.

5. The video control device according to claim 3, wherein the estimated orientation of the vehicle is calculated based on an average of the deviations in the orientations of the vehicle in consecutive intervals other than an interval in which a deviation in an orientation of the vehicle is a second threshold value or more, among the consecutive intervals.

6. The video control device according to claim 3, wherein the estimated orientation of the vehicle is calculated based on a median of the deviations in the orientations of the vehicle in the consecutive intervals.

7. The video control device according to claim 3, wherein the estimated orientation of the vehicle is calculated based on a weighted average of the deviations in the orientations of the vehicle in the consecutive intervals.

8. The video control device according to claim 1, wherein a future estimated orientation of the vehicle is outputted to the video display device, the future estimated orientation being predicted based on a past amount of change in the estimated orientation of the vehicle.

9. A video control method, comprising:
obtaining positions of a vehicle determined by a satellite positioning system;
obtaining an estimated position of the vehicle estimated based on dead reckoning;
estimating a deviation in an orientation of the vehicle, based on the positions of the vehicle determined by the satellite positioning system and the estimated position of the vehicle estimated based on the dead reckoning;
calculating an estimated orientation of the vehicle, based on the deviation in the orientation of the vehicle estimated; and
outputting the estimated orientation of the vehicle to a video display device that displays information which is based on the estimated orientation of the vehicle, wherein the deviation in the orientation of the vehicle is estimated based on:
- a first position of the vehicle determined by the satellite positioning system;
- a second position of the vehicle determined by the satellite positioning system when the vehicle moves from the first position; and
- the estimated position of the vehicle, which is obtained when the second position is determined and is estimated based on the dead reckoning, using (i) the first position, (ii) an orientation of the vehicle at the first position, (iii) a detection result of a gyro sensor provided in the vehicle, and (iv) speed information of the vehicle.

10. A non-transitory computer-readable recording medium including a program recorded thereon for causing a computer to execute a video control method, the video control method comprising:
- obtaining positions of a vehicle determined by a satellite positioning system;
- obtaining an estimated position of the vehicle estimated based on dead reckoning;
- estimating a deviation in an orientation of the vehicle, based on the positions of the vehicle determined by the satellite positioning system and the estimated position of the vehicle estimated based on the dead reckoning;
- calculating an estimated orientation of the vehicle, based on the deviation in the orientation of the vehicle estimated; and
- outputting the estimated orientation of the vehicle to a video display device that displays information which is based on the estimated orientation of the vehicle, wherein the deviation in the orientation of the vehicle is estimated based on:
- a first position of the vehicle determined by the satellite positioning system;
- a second position of the vehicle determined by the satellite positioning system when the vehicle moves from the first position; and
- the estimated position of the vehicle, which is obtained when the second position is determined and is estimated based on the dead reckoning, using (i) the first position, (ii) an orientation of the vehicle at the first position, (iii) a detection result of a gyro sensor provided in the vehicle, and (iv) speed information of the vehicle.

* * * * *